United States Patent [19]
Saito et al.

[11] Patent Number: 5,805,058
[45] Date of Patent: Sep. 8, 1998

[54] CONTROL CIRCUIT FOR VEHICULAR MOUNTED PASSENGER PROTECTING DEVICES

[75] Inventors: Yasuo Saito, Kumagaya; Takayuki Kishi, Omiya; Miyuki Demachi, Kawagoe, all of Japan

[73] Assignee: Kansei Corporation, Omiya, Japan

[21] Appl. No.: 628,795

[22] Filed: Apr. 4, 1996

[30] Foreign Application Priority Data

Apr. 7, 1995 [JP] Japan .................................... 7-082864
Mar. 25, 1996 [JP] Japan .................................... 8-068539

[51] Int. Cl.$^6$ .................................................. B60R 21/00
[52] U.S. Cl. ........................ 340/436; 340/438; 307/10.1; 280/728.1; 280/735; 180/282
[58] Field of Search ..................................... 340/438, 436; 307/10.1; 280/728.1, 728.2, 735; 180/282

[56] References Cited

U.S. PATENT DOCUMENTS 3,714,627  1/1973  Dillman et al. ......................... 340/436
5,442,244  8/1995  Furui ...................................... 340/436

FOREIGN PATENT DOCUMENTS

WO 90/02674  3/1990  WIPO .

OTHER PUBLICATIONS

Millman et al., "Integrated Electronics: Analog and Digital Circuits and Systems," *McGraw–Hill Kogakusha, Ltd.*, pp. 700–707, 1972.

*Primary Examiner*—Edward Lefkowitz
*Attorney, Agent, or Firm*—Foley & Lardner

[57] ABSTRACT

A passenger protecting device of a motor vehicle includes an acceleration sensor which issues an acceleration signal representative of the degree of a vehicle collision; a signal processing circuit which, by processing the acceleration signal, issues an ignition trigger signal when judging that the vehicle collision is critical; a DC power source for charging a plurality of back-up capacitors; a plurality of squibs each having first and second terminals, the first terminals of the squibs being connected to a common terminal and the second terminals of the squibs being connected to the back-up capacitors through respective connection lines; a first switch circuit having one terminal connected to the common terminal and the other terminal grounded; and a plurality of second switch circuits, each being disposed in each of the respective connection lines, each second switch circuit being turned ON when receiving the ignition trigger signal from the signal processing circuit. According to the invention, each of the second switch circuits comprises a current limiting means by which a current supplied from each of the back-up capacitors to the corresponding squib is limited.

5 Claims, 3 Drawing Sheets

5,805,058

CONTROL CIRCUIT FOR VEHICULAR MOUNTED PASSENGER PROTECTING DEVICES

BACKGROUND OF THE INVENTION

1. Field of the Invention

The present invention relates in general to vehicular mounted passenger protecting devices, such as air-bags, seat belts or the like, and more particularly to control circuits for controlling driving devices of such passenger protecting devices. More specifically, the present invention is concerned with a control circuit for a multi-squib passenger protecting system which includes a plurality of squibs for air-bags, pretensioners of seat belts and the like.

2. Description of the Prior Art

In order to clarify the task of the present invention, two types of conventional control circuits for a passenger protecting device will be described with reference to FIGS. 3 and 4 of the accompanying drawings.

In FIG. 3, there is shown one conventional control circuit for a single-squib system which includes only one squib.

In the drawing, denoted by numeral 1 is a battery mounted on a vehicle. Denoted by numeral 2 is a known ignition switch for operating an engine of the vehicle. Denoted by numeral 3 is a first reverse current blocking diode, and 4 is a step-up transforming circuit (namely, DC/DC converter) for stepping up the output voltage of the battery 1. An input terminal of the transforming circuit 4 is connected to a positive terminal of the battery 1 through the first diode 3 and the ignition switch 2 which are connected in series, as shown. An anode terminal of the first diode 3 is connected to an anode terminal of a second reverse current blocking diode 5, and an output terminal of the step-up transforming circuit 4 is connected to a cathode terminal of the second diode 5, as shown.

Denoted by numeral 7 is a back-up capacitor, one terminal of which is connected to the output terminal of the transforming circuit 4 through a rush current blocking resistor 6. A discharging diode 8 is arranged in parallel with the rush current blocking resistor 6.

Denoted by numeral 9 is a switching transistor. An emitter terminal of the transistor 9 is connected to the output terminal of the transforming circuit 4, and a base terminal of the transistor 9 is connected to one of output terminals of a microcomputer 12. A collector terminal of the transistor 9 as connected to one terminal of a squib 10. The squib 10 induces the inflation of an air-bag or the operation of a pretensioner of a seat-belt when energized. When the microcomputer 12 feeds the base terminal with an ignition trigger signal of a certain pulse width, the switching transistor 9 becomes ON. The current supply to the squib 10 is controlled in accordance with the pulse width of the ignition trigger signal. The other terminal of the squib 10 is connected to one terminal of a known mechanical acceleration switch 11. The other terminal of the switch 11 is grounded. The acceleration switch 11 is of a normally open type and generally comprises a magnet in the shape of a ring, a reed switch arranged to pass through an aperture of the ring-shaped magnet and a spring for biasing the magnet in one direction. When, due to a vehicle collision or the like, a certain inertial force is applied to the magnet, the magnet is forced to move along its axis against the force of the spring. Upon this, the magnetic force produced by the magnet forces the reed switch to turn ON.

Denoted by numeral 13 is an acceleration sensor which, upon a vehicle collision, issues a signal representative of the degree of an acceleration caused by the collision. The acceleration signal is supplied to the microcomputer 12. That is, when, upon receiving the signal, the microcomputer 12 judges that the collision is critical, the microcomputer 12 supplies a certain ignition trigger signal to the base terminal of the switching transistor 9 for a given time to drive the switching transistor 9.

Denoted by numeral 14 is a constant voltage power source. An input terminal of this power source 14 is connected to the battery 1 through a third reverse current blocking diode 15 and the ignition switch 2 which are connected in series. The input terminal of the constant voltage power source 14 is connected through a power source switching transistor 16 to the back-up capacitor 7. ON/OFF operation of the switching transistor 16 is controlled by a low-level signal issued from the microcomputer 12. The microcomputer 12 monitors the voltage of the power provided by the constant voltage power source 14. That is, when judging that the ignition switch 2 is turned OFF or judging that unexpected wire breaking occurs in a major power circuit, the microcomputer 12 controls the power source switching transistor 16 to become ON.

It is to be noted that the second reverse current blocking diode 5, the rush current blocking resistor 6, the back-up capacitor 7, the discharging diode 8, the switching transistor 9 and the squib 10 constitute an ignition current supplying circuit 17 which is enclosed by a block illustrated by a broken line in FIG. 3.

When a vehicle collision or the like occurs, the acceleration sensor 13 issues an acceleration signal representative of the degree of the collision. Upon receiving and processing the acceleration signal, the microcomputer 12 judges whether the collision is critical or not. If YES, that is, if the collision is critical, the microcomputer 12 outputs an ignition trigger signal to the switching transistor 9 to keep the same ON for a certain time. Thus, during this time, an electric power which has been charged in the back-up capacitor 7 is fed to the squib 10 through the discharging diode 8. Thus, a corresponding air-bag or a pretensioner of a seat-belt is driven or operated. Of course, the operation of the air-bag or the seat-belt pretensioner takes place only when the mechanical acceleration switch 11 becomes ON.

Referring to FIG. 4, there is shown a conventional control circuit for a multi-squib system including a plurality of squibs. The multi-squib system shown in the drawing includes four squibs 101, 102, 103 and 104 which are arranged in parallel with one another. These squibs 101, 102, 103 and 104 are arranged to operate an air-bag for a driver, a seat-belt pretensioner for the driver, an air-bag for a front seat passenger and a seat-belt pretensioner for the front seat passenger, respectively.

As shown in FIG. 4, in this control circuit, between the ignition switch 2 and the mechanical acceleration switch 11, there are arranged in parallel four ignition current supplying circuits, which are enclosed by a block illustrated by a broken line 17' in the drawing, each corresponding to the above-mentioned ignition current supplying circuit 17 of FIG. 3.

Denoted by numerals 51, 52, 53 and 54 are diodes each corresponding to the second diode 5 of FIG. 3, and denoted by numerals 91, 92, 93 and 94 are switching transistors each corresponding to the switching transistors 9 of FIG. 3. Denoted by numerals 71, 72, 73 and 74 are back-up capacitors each corresponding to the back-up capacitor 7 of FIG. 3. Denoted by numerals 81, 82, 83 and 84 are discharging diodes each corresponding to the discharging diode 8 of FIG. 3.

Denoted by numerals 18, 19, 20 and 21 are discharged current blocking diodes each being interposed between the output terminal of the step-up transforming circuit 4 and the non-grounded terminal of the corresponding back-up capacitor 71, 72, 73 or 74, as shown.

Denoted by numerals 22, 23, 24 and 25 are reverse current blocking diodes each being interposed between the non-grounded terminal of the mechanical acceleration switch 11 and the other terminal of the corresponding squib 101, 102, 103 or 104, as shown.

Between each switching transistor 91, 92, 93 or 94 and each output terminal of the microcomputer 12, there is arranged a driving transistor 26, 27, 28 or 29, as shown.

As shown, the emitter terminal of the power source switching transistor 16 is connected to the non-grounded terminal of one of the four back-up capacitors 71, 72, 73 and 74, that is, of the back-up capacitor 71.

However, due to its inherent construction, the above-mentioned control circuit of FIG. 4 has the following drawbacks.

That is, when, due to a vehicle collision or the like, the switching transistors 91, 92, 93 and 94 are turned ON having their ON conditions overlapped, a marked electric power which has been charged in all the four back-up capacitors 71, 72, 73 and 74 rushes into the mechanical acceleration switch 11 in a short time, Thus, if the current capacity of the mechanical acceleration switch 11 is not enough, it tends to occur that switching points of the switch 11 are melted upon receiving such marked electric power. If, for eliminating this drawback, increase in current capacity of the switch 11 is made, the production cost and size of the entire system are inevitably increased.

SUMMARY OF THE INVENTION

It is therefore an object of the present invention to provide a control circuit for a multi-squib passenger protecting system, which is free of the above-mentioned drawbacks.

According to the present invention, there is provided a control circuit for a multi-squib passenger protecting device, which can reduce the maximum current. supplied to the mechanical acceleration switch thereby to enable the switch to have a smaller current capacity.

According to the present invention, there is provided a control circuit for a multi-squib passenger protecting system, which is reliable in operation and economical in production.

According to the present invention, there is provided a passenger protecting device of a motor vehicle, which comprises an acceleration sensor which issues an acceleration signal representative of the degree of a vehicle collision; a signal processing circuit which processes the acceleration signal to determine whether the vehicle collision is critical or not, the signal processing circuit issuing an ignition trigger signal when judging that the vehicle collision is critical; a DC power source for charging a plurality of back-up capacitors; a plurality of squibs each having first and second terminals, the first terminals of the squibs being connected to a common terminal and the second terminals of the squibs being connected to the back-up capacitors through respective connection lines; a first switch circuit having one terminal connected to the common terminal and the other terminal grounded; and a plurality of second switch circuits, each being disposed in each of the respective connection lines, each second switch circuit being turned ON when receiving the ignition trigger signal from the signal processing circuit, wherein each of the second switch circuits comprises a transistor having base, emitter and collector terminals, the collector terminal being connected to corresponding one of the squibs; a first resistor having one terminal connected to the emitter terminal and the other terminal connected to corresponding one of the back-up capacitors; a Zener diode having one terminal connected to the base terminal and the other terminal connected to the corresponding one of the back-up capacitors; and a second resistor having one terminal connected to the base terminal and the other terminal connected to the signal processing circuit.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
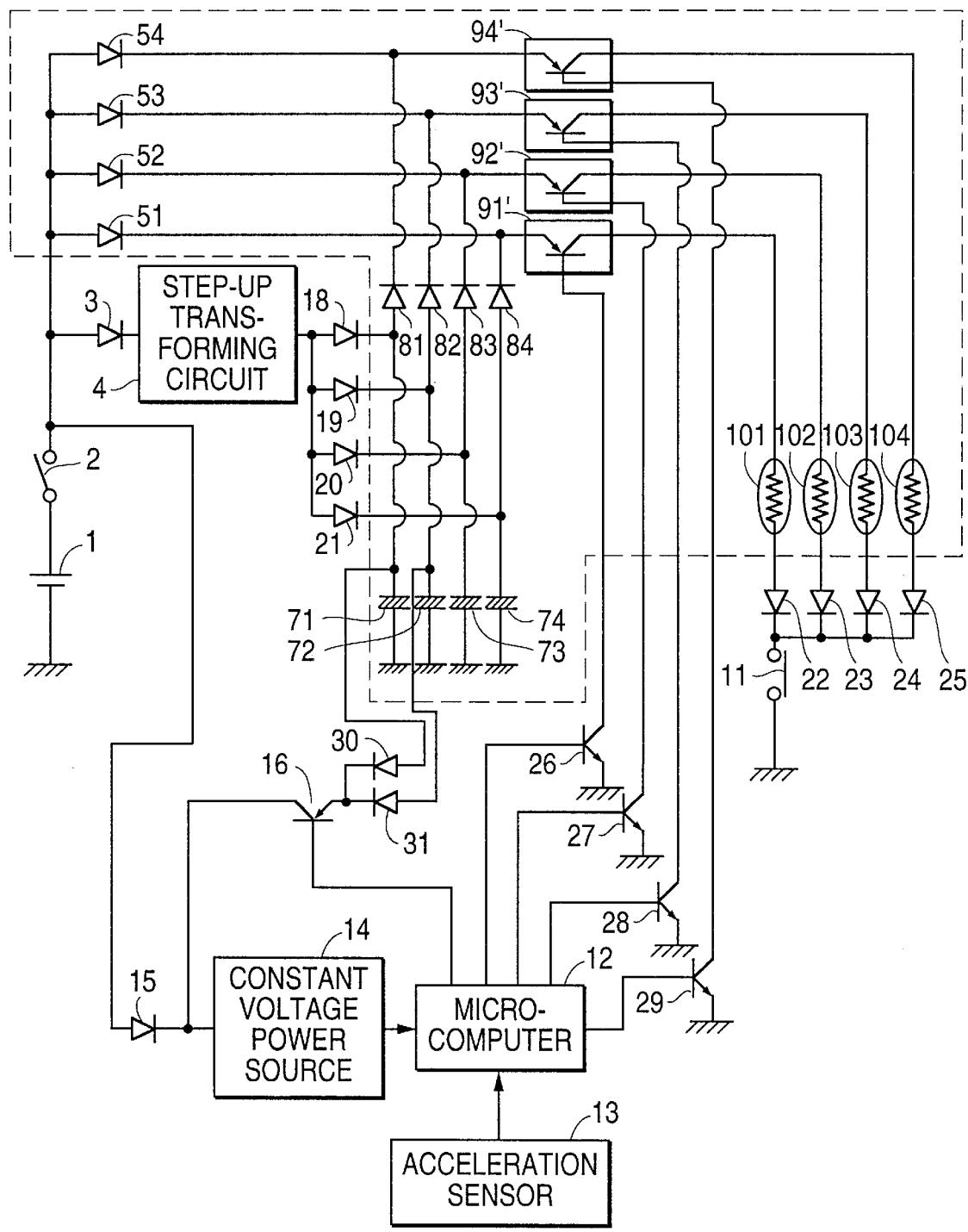
FIG. 1 is a control circuit for a multi-squib passenger protecting system, according to the present invention.
Figure 2:
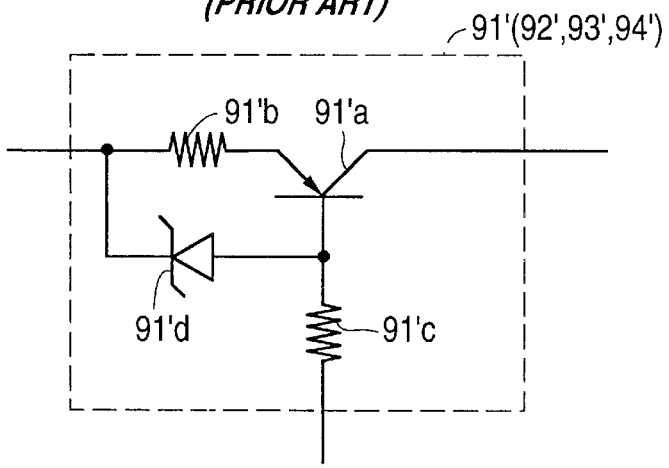
FIG. 2 is a detailed view of one of identical switching circuits employed in the present invention.
Figure 3:
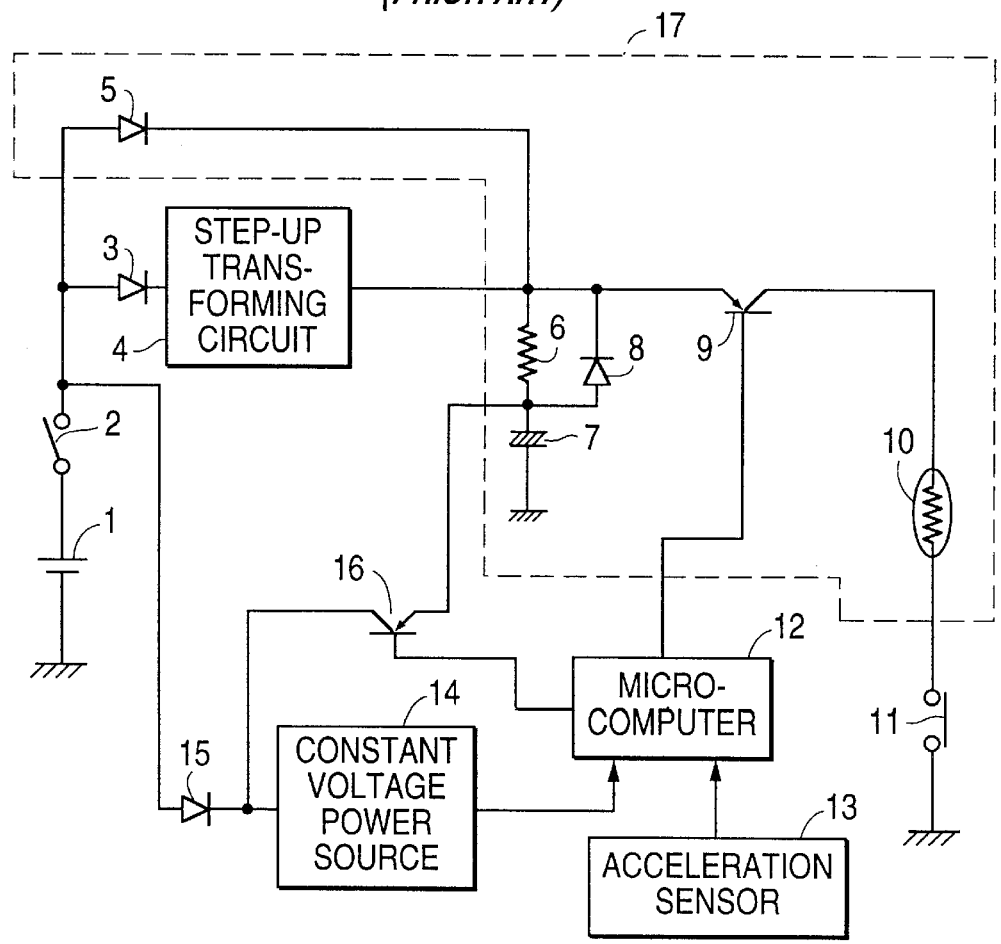
FIG. 3 is a conventional control circuit for a single-squib passenger protecting system.

Referring to FIGS. 1 and 2 of the drawings, particularly FIG. 1, there is shown a control circuit for a multi-squib passenger protecting system according to the present invention.

Since the control circuit of the present invention is similar to the above-mentioned conventional control circuit of FIG. 4, only parts and arrangements which are different from those of the conventional one will be described in detail in the following.

Figure 4:
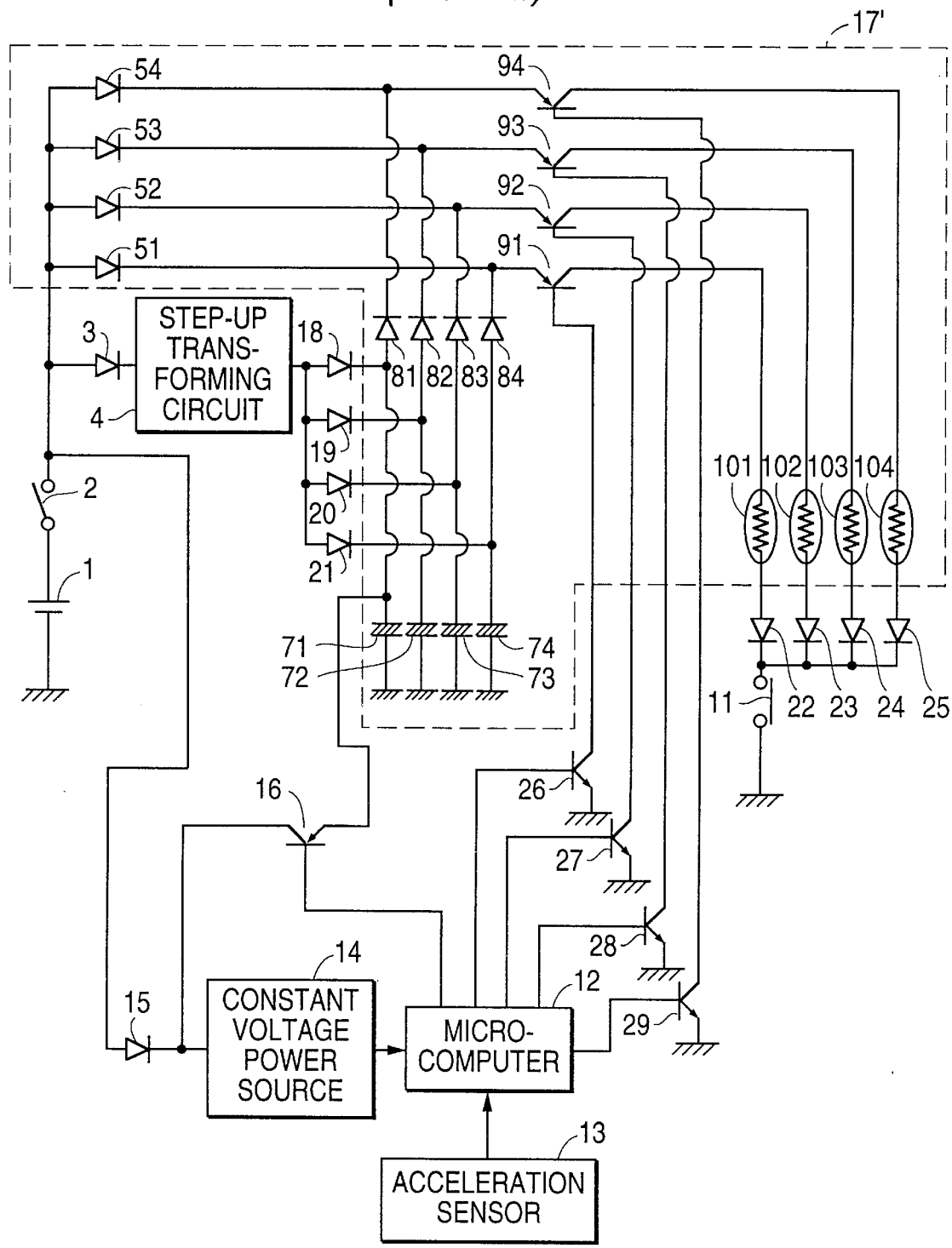
FIG. 4 is a conventional control circuit for a multi-squib passenger protecting system.

First, in the invention, in place of the switching transistors 91, 92, 93 and 94 employed in the conventional control circuit of FIG. 4, identical switching circuits 91', 92', 93' and 94' are employed, which are each depicted by FIG. 2. Such switching circuit is described in page 504 of "Integrated Electronics" of McGRAW-HILL published on Jun. 25, 1986. The detail of the circuits 91', 92', 93' and 94' will be described in detail hereinafter.

Second, in place of the direct connection between the emitter terminal of the switching transistor 16 and the back-up capacitor 71 employed in the conventional circuit of FIG. 4, a circuit is employed in the invention. That is, as is shown, the circuit includes a first line which extends from the non-grounded terminal of the back-up capacitor 71 to the emitter terminal of the switching transistor 16 through a diode 30 and a second line which extends from the non-grounded terminal of the back-up capacitor 72 to the emitter terminal of the switching transistor 16 through a diode 31.

The detail of the switching circuits 91', 92', 93' and 94' will be described in the following with reference to FIG. 2. Because of their identical construction, only the switching circuit 91' is illustrated in FIG. 2 for simplification of description.

As is seen from this drawing, the switching circuit 91' (92', 93' or 94') comprises a transistor 91'a, a first resistor 91'b, a second resistor 91'c and a Zener diode 91'd. That is, a collector terminal of the transistor 91'a is connected to the non-grounded terminal of the squib 101, 102, 103 or 104. An emitter terminal of the transistor 91′a is connected through the first resistor 91′b to the cathode terminal of the discharging diode 81, 82, 83 or 84. The Zener diode 91′d is interposed between a base terminal of the transistor 91′a and a junction point between the first resistor 91′b and the cathode terminal of the discharging diode 81, 82, 83 or 84. The base terminal of the transistor 91′a is connected through the second resistor 91′c to the collector terminal of the driving transistor 26, 27, 28 or 29.

The transistor 91′a is set to operate at the active region. That is, when the transistor 91′a is turned ON at such active region, the squib 101, 102, 103 or 104 is supplied with a current "$I_1$" which is represented by the following equation:

$$I_1 = Vz/R_1 \ldots \quad (1)$$

wherein: Vz: Zener voltage of Zener diode 91′d, $R_1$: resistance value of first resistor 91′b.

It is to be noted that the current "$I_1$" is a certain current which has been subjected to a so-called current limitation by the Zener diode 91′d.

Accordingly, in this case, the mechanical acceleration switch 11 is fed with a current "$I_2$" which is represented by the following equation:

$$I_2 = 4 \times I_1 = 4 \times Vz/R_1 \ldots \quad (2)$$

As is understood to those skilled in the art, the current "$I_2$" is apparently small as compared with that fed to the acceleration switch 11 of FIG. 4.

In the present invention, the following measure is further employed.

A temperature coefficient "$\gamma_1$" of the base/emitter voltage "VBE" of the transistor 91′a and a temperature coefficient "$\gamma_2$" of the Zener voltage of the Zener diode 91′d are set to have a generally identical value. Furthermore, in order that a current led to the emitter terminal of the transistor 91′a is almost all directed toward the collector terminal, the parameter "hfe" of the transistor 91′a is set about 100.

Accordingly, if the first resistor 91′b has a resistance value of "R", a current "$I_3$" which would flow therethrough is represented by the following equation:

$$I_3 = ((Vz + \gamma_1 \cdot T) - (VBE + \gamma_2 \cdot T))/R \ldots \quad (3)$$

wherein: T: temperature.

Because the equality "$\gamma_1 = \gamma_2$" is established, the equation (3) can be reformulated to:

$$I_3 = (Vz - VBE)/R \ldots \quad (4)$$

This means that the current "$I_3$" which flows through the first resistor 91′b, that is, the current which flows through the squib, 101, 102, 103 or 104 is not influenced by a surrounding temperature. That is, even when the surrounding temperature changes, the current "$I_3$" is kept unchanged or constant.

Accordingly, for determining the current capacity of the back-up capacitors 71, 72, 73 and 74, there is no need of considering the influence caused by the temperature change. Thus, relatively small capacity type can be used as the back-up capacitors 71, 72, 73 and 74 in the present invention.

If desired, in the present invention, the driving transistors 26, 27, 28 and 29 may be so controlled by the microcomputer 12 that ON conditions thereof take place at different timings.

What is claimed is:

1. A passenger protecting device of a motor vehicle having an ignition switch, comprising:

an acceleration sensor which issues an acceleration signal representative of a degree of a vehicle collision;

a signal processing circuit which processes said acceleration signal to determine whether the vehicle collision is critical or not, said signal processing circuit issuing an ignition trigger signal when judging that the vehicle collision is critical;

a DC power source for charging a plurality of back-up capacitors;

a plurality of squibs each having first and second terminals, the first terminals of said squibs being connected to a common terminal and the second terminals of said squibs being connected to said back-up capacitors through respective connection lines;

a first switch circuit having one terminal connected to said common terminal and the other terminal grounded;

a plurality of second switch circuits, each being disposed in each of said respective connections lines, each second switch circuit being turned ON when receiving said ignition trigger signal from said signal processing circuit, each of said second switch circuits including, a transistor having base, emitter, and collector terminals, said collector terminal being connected to a corresponding one of said squibs;

a first resistor having one terminal connected to said emitter terminal and the other terminal connected to a corresponding one of said back-up capacitors;

a Zener diode having one terminal connected to said base terminal and the other terminal connected to the corresponding one of said back-up capacitors; and a second resistor having one terminal connected to said base terminal and the other terminal connected to said signal processing circuit;

a constant voltage power source connected to said ignition switch;

a switching transistor having base, emitter and collector terminals, said collector terminal of said switching transistor being connected to said constant voltage power source, and said base terminal of said switching transistor being connected to said signal processing circuit;

a first diode having an anode connected to one of said back-up capacitors and a cathode connected to said emitter terminal of said switching transistor; and a second diode having an anode connected to another of said back-up capacitors and a cathode connected to said emitter terminal of said switching transistor, wherein said signal processing circuit monitors an output of said constant voltage power source to determine when said ignition switch is turned OFF, and wherein said signal processing circuit outputs a signal to said base terminal of said switching transistor when said ignition switch is determined to be OFF so as to turn said switching transistor ON.

2. A passenger protecting device as claimed in claim 1, in which said transistor is set to operate at an active region.

3. A passenger protecting device as claimed in claim 1, in which a temperature coefficient of a base/emitter voltage of said transistor is substantially the same as that of a Zener voltage of said Zener diode.

4. A passenger protecting device as claimed in claim 1, further comprising:

a plurality of driving transistors connected between said signal processing circuit and a respective one of said plurality of second switch circuits, wherein upon receipt of said ignition trigger signal from said signal processing circuit, one of said driving transistors is turned ON, thereby causing a corresponding one of said second switch circuits to be turned ON, and wherein said signal processing circuit is configured so as to turn ON each of said plurality of driving transistors at different times.

5. A passenger protecting device as claimed in claim 1, wherein said plurality of second switch circuits are constant current sources that provide a constant current to said corresponding squibs when said plurality of second switch circuits are turned ON.

\* \* \* \* \*